March 7, 1950      B. SZNYCER      2,499,696
ROOT FOR ROTATING WINGS
Filed Dec. 10, 1948      3 Sheets-Sheet 1
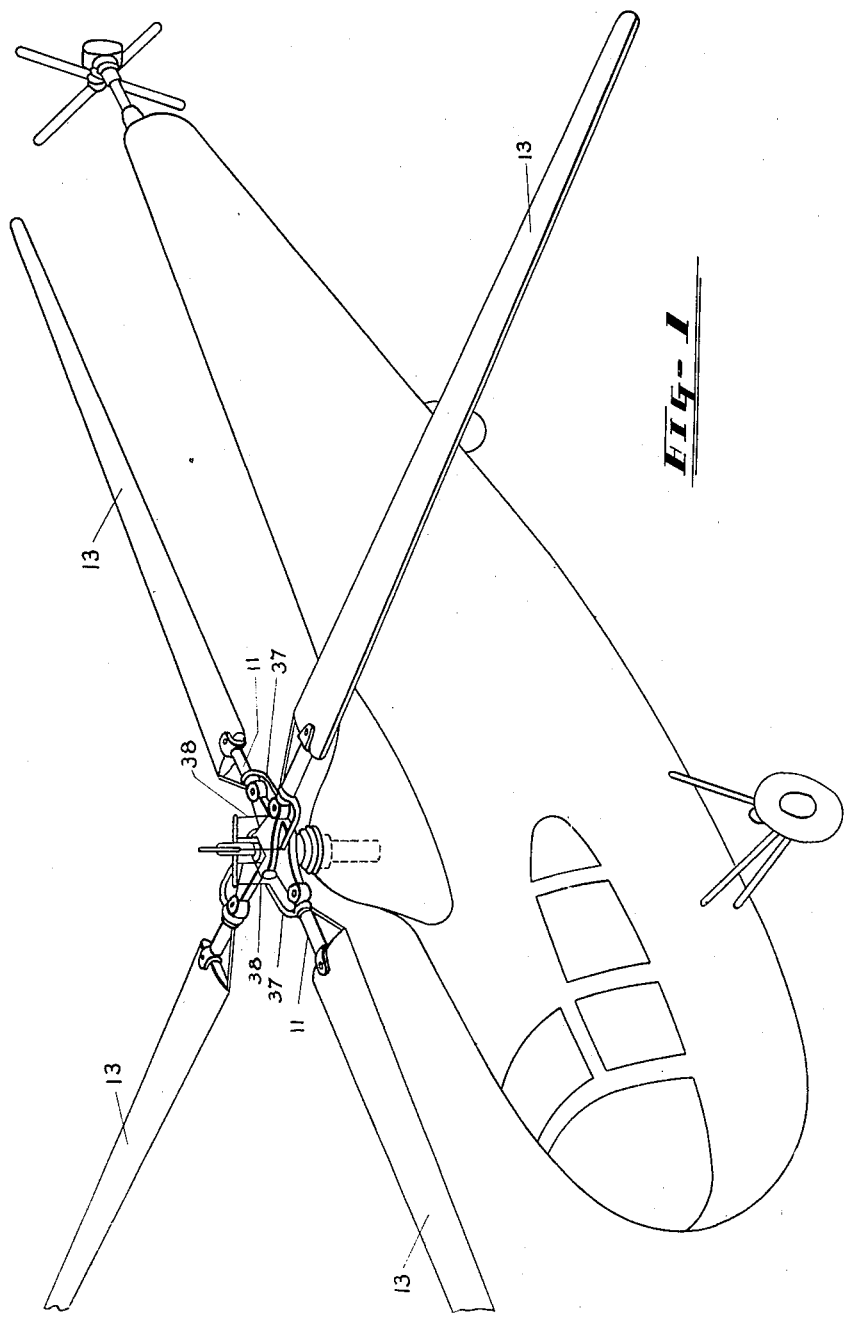
INVENTOR
Bernard Sznycer
by Edward N. Fetherstonhaugh
ATTORNEYS

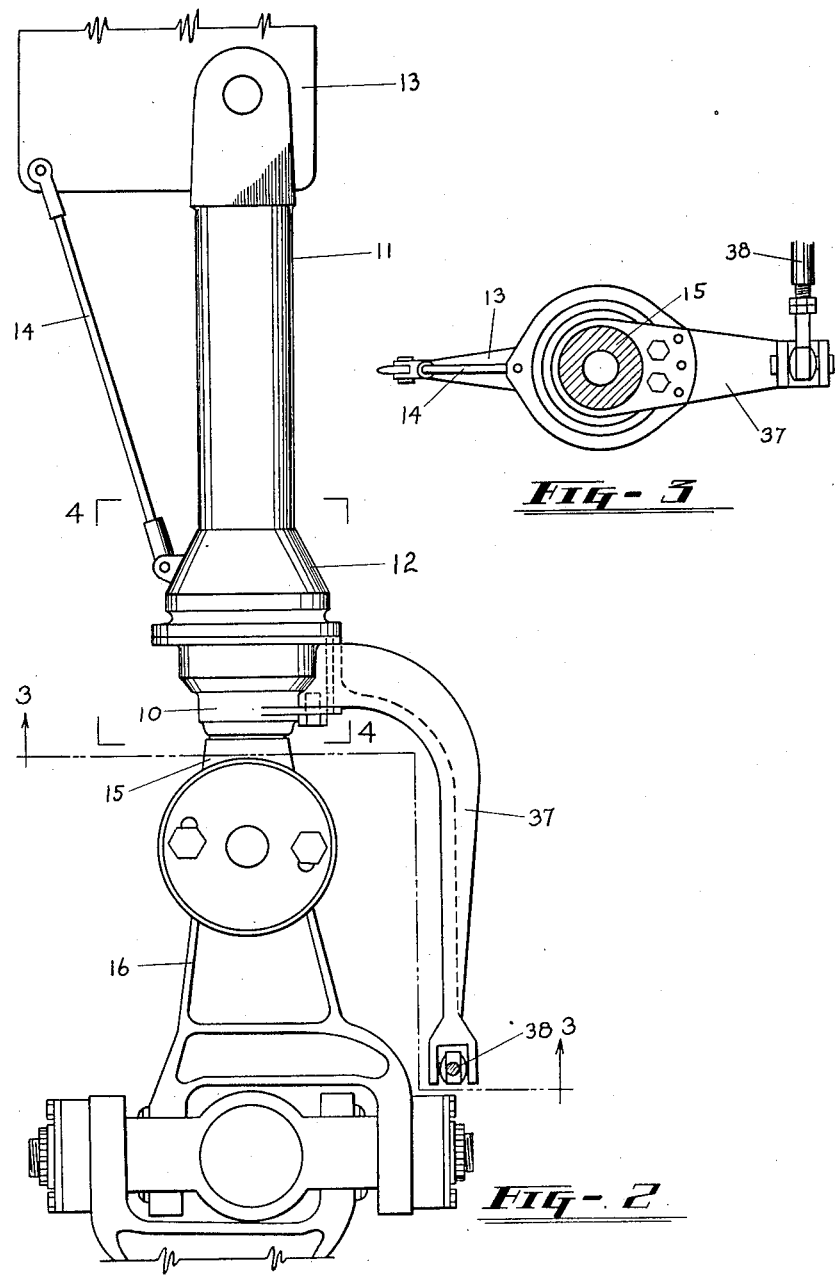

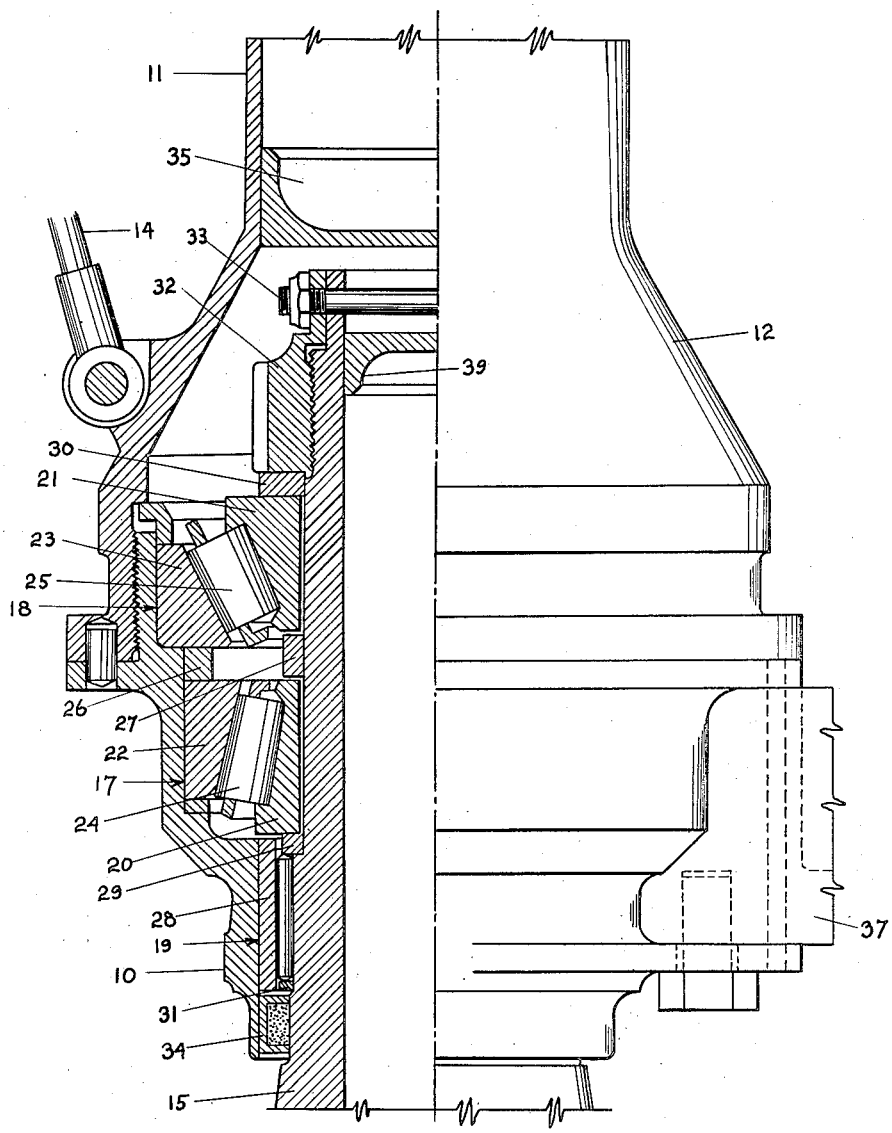

Patented Mar. 7, 1950

2,499,696

UNITED STATES PATENT OFFICE 2,499,696

ROOT FOR ROTATING WINGS

Bernard Sznycer, New York, N. Y., assignor to Intercity Airline Company, Montreal, Quebec, Canada Application December 10, 1948, Serial No. 64,532
In Canada February 3, 1947

1 Claim. (Cl. 308—174)

The invention relates to improvements in a root for rotating wings, as described in the present specification and illustrated in the accompanying drawings that form a part of the same.

The invention consists essentially of the novel features of construction as pointed out broadly and specifically in the claims for novelty following a description containing an explanation in detail of an acceptable form of the invention.

The objects of the invention are to provide a root for rotating wings on aircraft such as helicopters and the like; to devise a root which will substantially support a wing or blade on an aircraft; to construct a root for rotating wings which will facilitate the feathering of the same; to provide a root for rotating wings in which the bearings for the same will wear evenly thus minimizing the danger of brinelling; to devise a root for rotating wings which will be capable of resisting axial and radial stress; to construct a root for rotating wings in which the various parts may be easily adjusted so as to prolong the life of the same; to devise a root for rotating wings which will be sturdy and yet light in weight; and generally to provide a root for rotating wings which will be durable, dependable and efficient, for its purpose.

In the drawings;

Figure 1 is a perspective view of an aircraft showing the root attachment assembled thereon.

Figure 2 is a plan view showing the root attachment assembled between the blade shank and the adaptor for the blade.

Figure 3 is a sectional view as taken on the line 3—3 in Figure 2.

Figure 4 is an enlarged side view partly in section showing the root attachment as indicated in Figure 2.

Like numerals of reference indicate corresponding parts in the various figures.

Referring to the drawings, the root for rotating wings consists of the bearing housing as indicated by the numeral 10. The adaptor 11 is hollow throughout the greater length of same and the inner end thereof is tapered outwardly to form a cup portion 12. The inner end of this cup 12 is internally threaded and engages with the externally threaded portion on the outer end of the bearing housing 10.

In this manner the bearing housing 10 in cooperation with the cup portion 12 of the adaptor 11 enclose the bearings of the root attachment. The free end of the adaptor 11 is fixedly secured to the root end of the blade 13 and the tie rod 14 provided a reinforcing for the same.

The spindle 15 is suitably connected to the blade yoke 16, which in turn, is suitably mounted on a driving means.

The spindle 15 extends into the bearing housing 10 and the cup portion 12 of the adaptor 11. The taper roller bearings 17 and 18 and the needle bearing 19 are suitably arranged so as to facilitate the oscillation of the bearing housing 10 and adaptor 11 on the spindle 15. The inner races or cones 20 and 21 of the taper roller bearings 17 and 18, respectively, are fitted on the spindle 15 in such a manner so as to permit a slight rotary movement of the same thereon. The clearances between the bore of the inner races 20 and 21 and the spindle 15 are greater than that of standard practice, but not sufficient to cause faulty operation of the same. The outer races or cups 22 and 23 are fixedly fitted in the bearing housing 10 and the bearing rollers 24 and 25 are accommodated between the same and the inner races 20 and 21 respectively. The outer races 22 and 23 are held tightly against the spacer 26; while a clearance is provided between the inner races 20 and 21 and the spacer 27. The shell 28 of the needle bearing 19 is a press fit in the bearing housing 10 and the needles or rollers of the same ride on the spindle 15.

The spacer 29 is located between the inner race 20 of the bearing 17 and the needle bearing 19; while the spacer 30 holds the outer edge of the inner race 21 of the bearing 18 in position. The ring 31 is a press fit on the spindle 15 and rests against a shoulder on the same. The bearings 17 and 18 are retained on the spindle 15 between the spacer 29 and the lock nut 32; while the bearing 19 is held in position on the same by the ring 31 and the spacer 29. The bolt 33 provides a means of locking the lock nut 32 in position on the spindle 15 after the same has been suitably adjusted.

The seal 34 is a press fit in the inner end of the bearing housing 10 and forms a seal around the spindle 15. The cup portion 12 of the adaptor 11 is sealed off from the hollow portion of same by means of the plug 35. The seal 34 and plug 35 seal the bearings 17, 18 and 19 within the closure formed by the bearing housing 10 and cup portion 12 of the adaptor 11 so that a lubricant may be contained therein. The plug 39 is fitted within the hollow portion of the spindle 15 thus preventing the lubricant from entering the same and escaping from the bearing housing 10 and adaptor 11.

The pin 36 locks the bearing housing 10 substantially in position with respect to the adaptor 11 after the same have been threaded together.

The control horn 37 is fixedly secured on the bearing housing 10 and adapted to be operated by the link 38, thus providing a means of oscillating the adaptor 11 and blade 13.

In the operation of the invention the bearing 18, which is of the taper roller type, takes the thrust due to centrifugal force, and in combination with the spacers 26 and 27 and the adaptor 11, this bearing locks the blade 13 axially. The bearing 17 provides a locking support for the bearing 18 in accordance with common practice. The lock nut 32 which is fixedly secured on the spindle 15 transmits the thrust due to centrifugal force into the blade yoke 16. The bearings 17 and 18 are adapted to take only axial load; while the needle bearing 19 takes all of the radial load and none of the thrust load. The clearance provided between the inner races of the bearings 17 and 18 and the spindle 15 permits these inner races to change their position relative to the outer races of same, which coupled with the fact that the bearings are loaded only in one direction, counteracts the danger of brinelling.

It will be seen from the foregoing that a root for rotating wings has been provided that will minimize the brinelling of the bearings in same, which normally would cause a serious vibratory problem.

What I claim is:

In a root for rotating wings, the combination of a spindle and a housing rotatable thereon, a pair of taper roller bearings and a needle bearing supporting said housing on said spindle, said taper roller bearings comprising outer races and inner races, said outer races of said taper roller bearings being fixedly secured in said housing, said inner races of said taper roller bearings being movably supported on said spindle and having a clearance therebetween, thus permitting said inner races to change their position relative to said outer races during oscillation of the latter, taper rollers accommodated between said outer races and said inner races of said taper roller bearings, a spacer within said housing and located between said outer races and substantially engaging the same, a second spacer fitted on said spindle and located between said inner races of said taper roller bearings, said second spacer being smaller than the space between said inner races thereby providing a clearance therebetween, said needle bearing comprising a shell and a plurality of needles rotatably supported therein, said shell being fixedly supported in said housing and said needles engaging a portion of the surface of said spindle, a third spacer located between said needle bearing and said inner race of one of said taper roller bearings and engaging the latter, a fourth spacer engaging the outer edge of the other of said inner races of said taper roller bearings, a locknut being threaded on said spindle and engaging said fourth spacer, and said locknut being adjusted to exert suitable pressure through said fourth spacer, said taper roller bearing adjacent said fourth spacer, said spacer between said taper roller bearings, the other of said roller bearings to said third spacer located between said last mentioned taper roller bearing and said needle bearing, thereby providing a means of holding said taper roller bearing assemblies substantially in position for operation and yet permitting said inner races of the same flexibility of movement so that said taper rollers will evenly wear the said inner races as they travel their restricted distances during oscillation of said outer races and said housing.

BERNARD SZNYCER.

REFERENCES CITED

The following references are of record in the file of this patent:

UNITED STATES PATENTS

| Number | Name | Date |
|---|---|---|
| 2,030,953 | Gemeny | Feb. 18, 1936 |
| 2,118,760 | Ernst | May 24, 1938 |
| 2,380,583 | Cierva | July 31, 1945 |
| 2,410,459 | Platt | Nov. 5, 1946 |
| 2,428,200 | Campbell | Sept. 30, 1947 |

FOREIGN PATENTS

| Number | Country | Date |
|---|---|---|
| 351,339 | Italy | Aug. 9, 1937 |